(12) United States Patent
Katayama et al.

(10) Patent No.: US 7,869,314 B2
(45) Date of Patent: Jan. 11, 2011

(54) DISC CONTROL DEVICE

(75) Inventors: Tsuyoshi Katayama, Kyoto (JP); Hirotsugu Taniguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 573 days.

(21) Appl. No.: 11/912,173

(22) PCT Filed: Apr. 20, 2006

(86) PCT No.: PCT/JP2006/308357

§ 371 (c)(1),
(2), (4) Date: Oct. 22, 2007

(87) PCT Pub. No.: WO2006/112509

PCT Pub. Date: Oct. 26, 2006

(65) Prior Publication Data

US 2009/0052287 A1    Feb. 26, 2009

(30) Foreign Application Priority Data

Apr. 20, 2005   (JP)   ............... 2005-123017

(51) Int. Cl.
*G11B 7/00*    (2006.01)

(52) U.S. Cl. ................. 369/44.32; 369/53.28

(58) Field of Classification Search ............. 369/44.29, 369/44.32, 44.34, 44.35, 44.36, 53.12, 53.13, 369/53.14, 53.15, 53.28
See application file for complete search history.

(56) References Cited

U.S. PATENT DOCUMENTS 7,215,606 B2 *   5/2007   Yonezawa ................ 369/44.29

FOREIGN PATENT DOCUMENTS

| JP | 8-77589 | 3/1996 |
|---|---|---|
| JP | 9-50303 | 2/1997 |
| JP | 11-161972 | 6/1999 |

* cited by examiner

*Primary Examiner*—Wayne R Young
*Assistant Examiner*—Brenda Bernardi
(74) *Attorney, Agent, or Firm*—Steptoe & Johnson LLP (57) ABSTRACT

A defect detection unit (5), a disc position detection unit (9), and a disc rotation speed detection unit (1) are in a disc control device which includes a repetition control device to control storing to and reading from a memory unit (3) functioning as a learning memory and for varying the number of memory divisions of the memory unit (3) on the basis of detection by the detection units. Components having periodicity apparently due to partial surface runout or partial eccentricity are stored in memory unit (3) by increasing the resolution and microscopic noise components, and noise components having no periodicity are not stored in memory unit (3). This system carries out stable focus tracking control even when disturbances such as device vibration or scratches on a disc are mixed.

6 Claims, 9 Drawing Sheets

DISC CONTROL DEVICE

The present application is based on International Application PCT/JP2006/308357, filed Apr. 20, 2006, which claims priority to Japanese Patent Application No. 2005-123017, filed Apr. 20, 2005, the entire contents of which are hereby incorporated by reference.

TECHNICAL FIELD

The present invention relates to a disc control device using a repetition control circuit, and more particularly to an improved optical disc control device for controlling an optical disc device.

BACKGROUND ART

In an optical disc device for recording information on an optical disc or reproducing information recorded on an optical disc, an optical servo for maintaining the focus of a laser beam onto an information recording track has been requiring to improve precision thereof at a rapid rate along with increase in the speed and density growth of optical discs, and attentions have been drawn to repetition control as a means to improve the precision.

Figure 10:
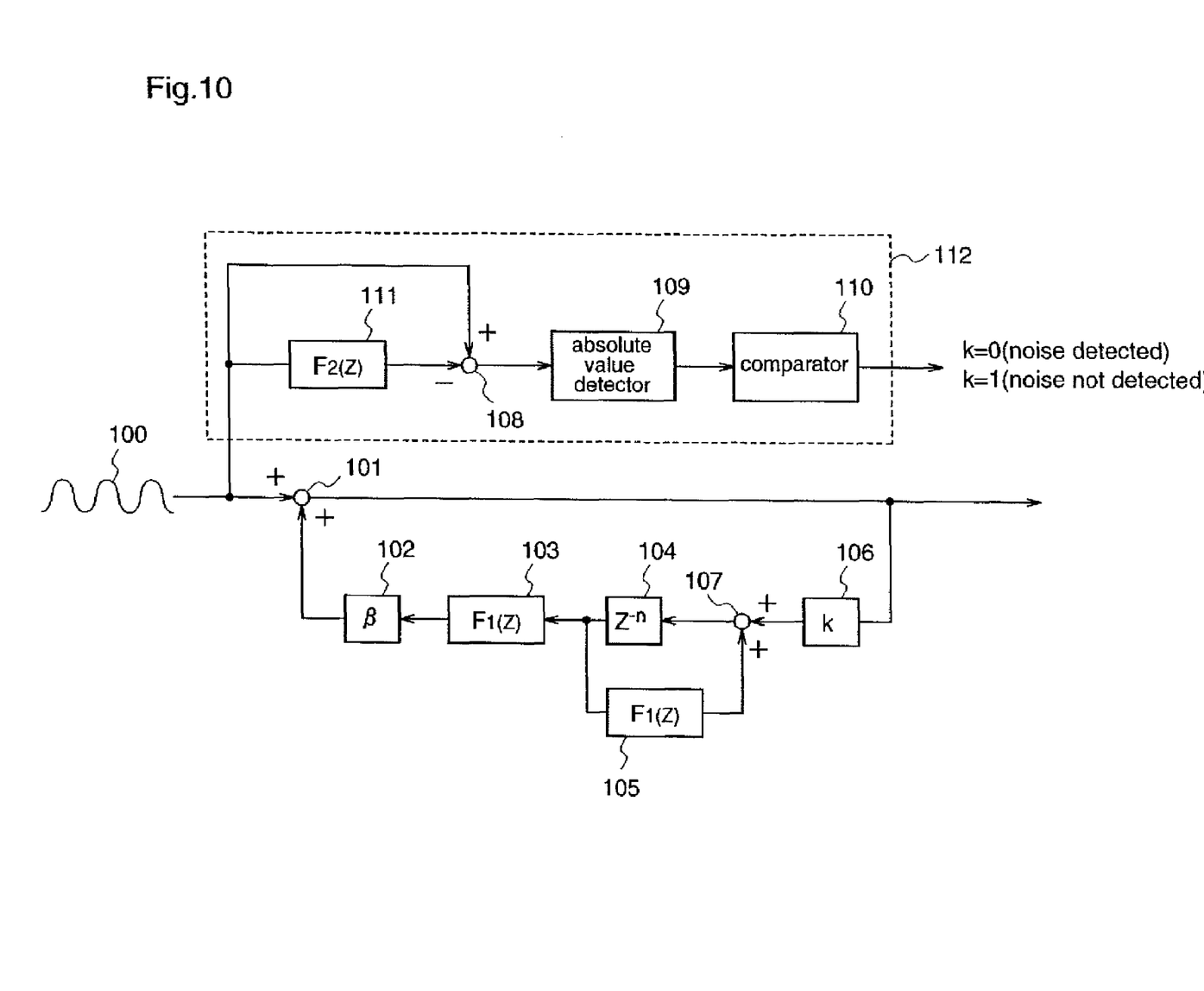
FIG. 10 is a diagram illustrating one a construction of a repetition control circuit in a conventional optical disc device.

FIG. 10 is a diagram illustrating a construction of a repetition control circuit in a conventional optical disc device. In the figure, reference numeral 101 denotes an adder for adding a compensated signal 100 having a periodical component, such as an error signal which is to become a tracking object, and an output signal of a circumference memory, i.e., a learning memory 104 which will be described below. Reference numeral 102 denotes an attenuation gain β for varying the degree of learning.

Reference numeral 103 denotes a low-pass filter for passing lower components of output signal of the learning memory 104, reference numeral 104 denotes a learning memory for storing frequency components of information corresponding to a single period (single rotation) of an optical disc, reference numerals 105 and 106 denote gain elements for switching the compensated signals to be stored in the learning memory 104, reference numeral 107 denotes an adder for adding output signals of the gain elements 105, 106, reference numeral 108 denotes a subtractor for subtracting the output signal of the low-pass filer 111 from the compensated signal 100, reference numeral 109 denotes an absolute value detection unit for detecting the absolute value of an output signal of the subtractor 100, reference numeral 110 denotes a comparator for comparing the output signal of the absolute value detection unit 109 with a predetermined value, and reference numeral 111 denotes a low-pass filter for passing lower components of the compensated signal 100.

By having the construction as described above, the compensated signal 100 having a periodic component, which is to become an input signal is first determined by a correlation detection unit 112 constituted by the low-pass filter 111, the subtractor 108, the absolute value detector 109, and the comparator 110 whether it has periodicity or not.

This is carried out to detect whether or not the compensated signal 100 which is inputted thereto is superposed with noise, disturbances, and influences due to scratches on the optical disc. And signal comparison is carried out at the correlation detection unit 112, and when there is a correlation, i.e., when noise is not detected as a result of the comparison, k=1 is outputted and signals corresponding to a single rotation of the disc are stored in the memory 104 via the gain element 106.

The signals stored in the memory 104 are fed back via the low-pass filter 103 and a gain element 102 for varying the degree of learning so as to satisfy stability conditions for repetition control.

Further, when it is detected by the correlation detection unit 122 that there is no correlation in a result of the signal comparison, i.e., when noise is detected, K=0 is outputted and storing of new signals is stopped by the gain element 106.

At this time, if the signals corresponding to a single rotation of the optical disc that are stored immediately before are stored in the memory again by the gain element 105, the tracking capability can be improved without attenuating the degree of learning even when disturbances are mixed.

Patent Document 1: Japanese Published Patent Application No. Hei. 9-50303

DISCLOSURE OF THE INVENTION

Problems to be Solved by the Invention

In the optical device employing conventional repetition control (learning control) as described above, tracking capability with respect to a periodic tracking object can be improved without broadening the control band compared to focus tracking control comprising direct-couple feedback control. Therefore, it is possible to correspond to a system which supports optical discs with narrow tracks, a system which supports optical discs with large eccentricities, and moreover, a system having high disc rotation speed, i.e., a system having a high information transmission rate.

However, as the speed of recording or reproduction process on an optical disc increases, partial surface runout or partial eccentricity having a frequency different from normal surface runout and eccentricity takes place particularly around in the periphery of the optical disc due to physical factors such as material deformation of the optical disc and unevenness of attached material.

Since the influence of the partial surface runout or partial eccentricity appears as a signal having periodicity which has a frequency different from those of normal surface runout and eccentricity, it is difficult to obtain enough tracking capability by carrying out the similar conventional control on a signal superposed with the partial surface runout or partial eccentricity and normal surface runout or eccentricity.

Moreover, when disturbances, such as scratches made on an optical disc or vibration applied to the optical disc device, are mixed in a compensated signal, a large difference is generated between the compensated signal currently being detected by the optical pickup and a signal corresponding to a single period which was detected immediately prior, and this error cannot be suppressed sufficiently. Accordingly, focus tracking control cannot be performed in a stable manner.

The present invention is made to solve the above described problems and has for its object to provide a disc control device capable of exercising high tracking capability even when a compensated signal detected by an optical pickup is superposed with a plurality of noise components generated due to various causes.

Measures to Solve Problems

A disc control device of the present invention comprises an adder for receiving a compensated signal, a signal feedback system including a filter for making an output signal from the adder to have a necessary learning band, a memory unit for storing an output signal from the filter, and a gain element for multiplying an output signal from the filter, and a gain element for multiplying an output signal from the memory with a value less than 1 and inputting the signal to the adder, the signal feedback system storing an output signal from the adder and outputting the same to the adder, a correlation detection unit for detecting unnecessary signal components mixed in the compensated signal, and a memory control unit for controlling storing to and reading from the memory unit provided in the feedback signal unit on the basis of the unnecessary signal components detected by the correlation detection unit.

The disc control device of the present invention as identified above comprises, in the place of the memory control unit, a filter control unit for varying a cutoff frequency of the filter provided in the signal feedback system on the bases of the unnecessary signal components detected by the correlation detection unit.

Further, a disc control device of the present invention, comprises, in the place of the correlation detection unit and the memory control unit, a disc position detection unit for detecting a position on an optical disc, and a memory division variable unit for varying a number of memory divisions of the memory provided in the signal feedback system on the basis of the disc position detected by the disc position detection unit.

Further, a disc control device of the present invention comprises, in the place of the correlation detection unit and the memory control unit, a disc rotation speed detection unit for detecting rotation speed of an optical disc, and a memory division variable unit for varying a number of memory divisions of the memory unit provided in the signal feedback system on the basis of the rotation speed of the optical disc detected by the disc rotation speed detection unit.

Further, a disc control device of the present invention comprises, in the place of the correlation detection unit and the memory control unit, a disc position detecting device for detecting a position on an optical disc, a disc rotation speed detection unit for detecting the rotation speed of the optical disc, and a memory division variable unit for varying number of memory divisions of the memory unit provided in the signal feedback system on the basis of the disc position detected by the disc position detection unit and the rotation speed of the disc detected by the disc rotation speed detection unit.

Further, a disc control device of the present invention comprises, in the place of the correlation detection unit and the memory control unit, a defect detection unit for detecting noise components mixed in the compensated signal, a disc position detection unit for detecting a position on an optical disc, a memory control unit for controlling storing to and reading from the memory unit provided in the signal feedback system on the basis of the defects detected by the defect detection unit, and a memory division variable unit for varying memory divisions of the memory unit provided in the signal feedback system on the basis of the defects detected by the defect detection unit, the disc position detected by the disc position detection unit, and the rotation speed of the optical disc detected by the disc rotation speed detection unit.

Effects of the Invention

The present invention is constructed as described above and thereby having the following effects.

Since the memory control unit controls storing to and reading from the memory unit provided in the signal feedback system on the base of the unnecessary components detected by the correlation detection unit, even in cases recording or reproduction process is performed on a poor-quality disc that does not meet optical disc standards (hereinafter referred to as non-standard) at high speed, or in case where unexpected disturbance, i.e., vibration of the optical device (referred as device vibration), scratches on an optical disc, and the like are mixed, a stable focus tracking control can be carried out.

Further, since the filter control unit varies the cut-off frequency of the filter provided in the signal feedback system on the basis of the unnecessary signal components detected by the correlation detection unit, even in cases where recording or reproduction process on a non-standard poor-quality disc are performed at high speed or in cases where unexpected disturbance are mixed, focus tracking control can be carried stably.

Further, since the memory division variation unit varies the memory resolution of the memory unit provided in the signal feedback system on the basis of the disc position detected by the disc position detection unit, the memory resolution of the memory unit is increased, while the memory resolution of the memory unit is lowered at the inner periphery of the disc, thereby reducing the size of the memory or the number of access to the memory, thereby enhancing the performance of learning control, at the outer periphery of the disc on which partial surface runoff and partial eccentricity are likely to take place, thereby enhancing the performance of learning control.

Further, since the memory division variation unit varies the memory resolution of the memory unit provided in the signal feedback system on the basis of the disc rotation speed detected by the disc rotation speed detection unit, the performance of learning control can be improved by increasing the memory resolution of the memory unit when performing recording or reproducing operation at high speed, and the size of the memory being used or the number of accesses to the memory can be reduced by lowering the resolution when the speed is slow.

Further, since the memory variation unit varies the memory resolution of the memory unit provided in the signal feedback system on the basis of the disc position detected by the disc position detection unit and the disc rotation speed detected by the disc rotation speed detection unit, the memory resolution of the memory unit can be varied dependent on the disc position or speed variations at recording or reproduction, thereby realizing a stable focus tracking control.

Further, since the memory control unit controls storing to and reading from the memory unit in the signal feedback system on the base of the defect detection unit and the memory division variation unit varies the memory resolution of the memory unit in the signal feedback system on the basis of the defects detected by the defect detection unit, and the disc rotation speed detected by the disc rotation speed unit, while in cases where unexpected disturbance is superposed on a compensated signal, the memory control unit controls so as not to learn disturbance, and in case where periodic noise components such as partial surface runout and partial eccentricity are superposed, the memory resolution of the memory unit is varied on the basis of the detection result by the defect detection unit, the disc position detected by the disc position detection unit, and the disc rotation speed detected by the rotation speed detection unit to enable surely learning the periodic noise components. Thereby, a further stable focus tracking control can be realized.

DESCRIPTION OF REFERENCE NUMERALS

1 . . . adder
2 . . . gain element β
3 . . . memory unit (learning memory)
4 . . . filter
5 . . . defect detection unit
6 . . . memory control unit
7 . . . filter control unit
8 . . . memory division variable unit
9 . . . disc position detection unit
10 . . . disc rotation speed detection unit
100 . . . compensated signal

BEST MODE TO EXECUTE THE INVENTION

First Embodiment

Hereinafter, a disc control device according to a first embodiment of the present invention will be described.

Figure 1:
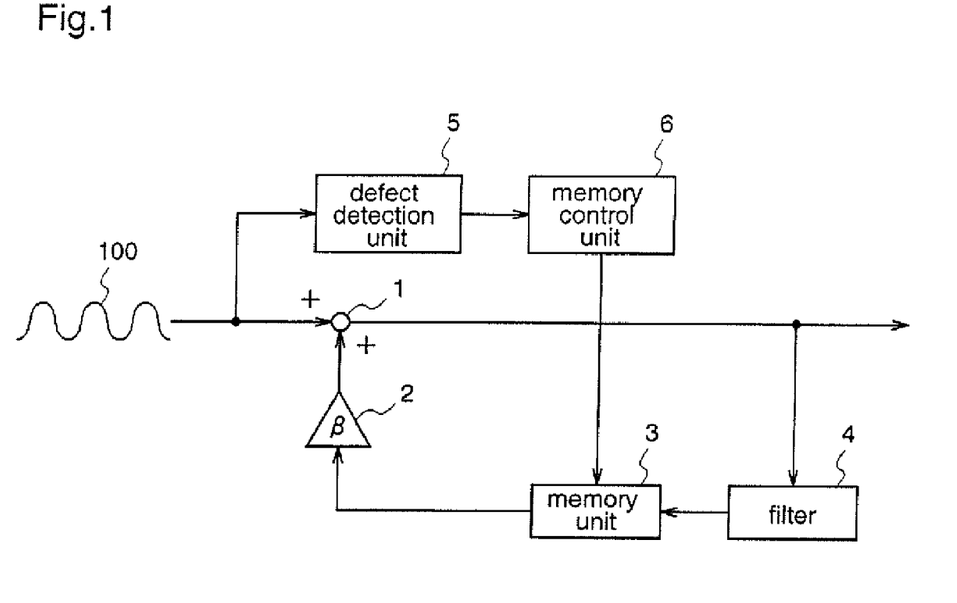
FIG. 1 is a block diagram illustrating one example of a construction of a disc control device according to a first embodiment of the present invention.

FIG. 1 is a block diagram illustrating one example of a construction of a disc control device according to the first embodiment of the present invention.

In FIG. 1, reference numeral 1 denotes an adder for adding a compensated signal 100 which is inputted thereto and an output from a memory unit 3 via a gain element β, reference numeral 2 denotes a gain element β as an attenuation gain for varying the degree of learning, and reference numeral 3 denotes a memory unit for storing an output signal from a filter 4.

Reference numeral 4 denotes the filter for making the output signal from the adder 1 to have a necessary learning band. The filter 4 is a filter which changes a normal tracking loop characteristic as shown in the left diagram of FIG. 9(a) to secure a required learning band (BLC) shown in FIG. 9(b) by increasing the cut off frequency through increasing a gain in the necessary learning band as shown in FIG. 9(b).

Figure 9A:
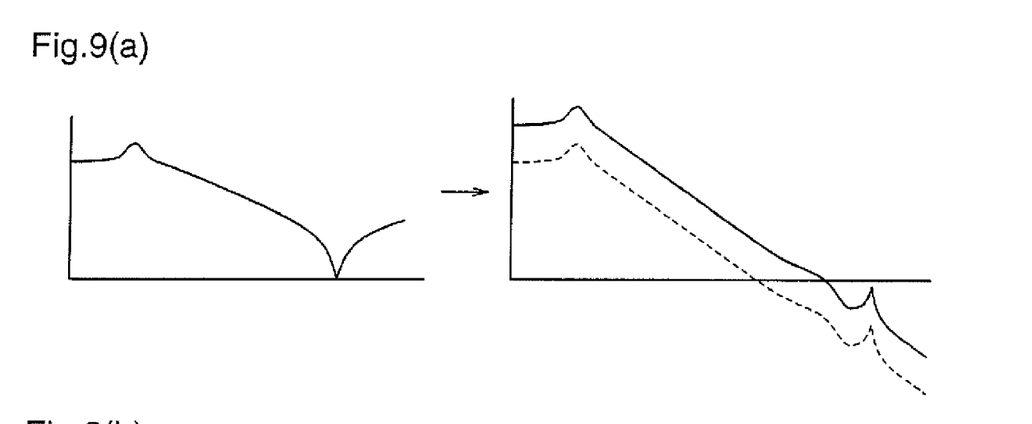
FIG. 9(a) is a diagram illustrating a normal tracking characteristic.
Figure 9B:
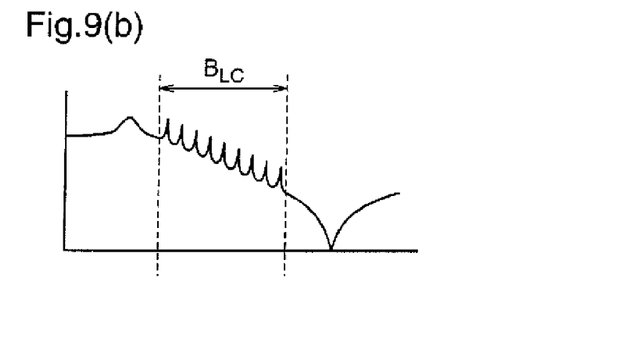
FIG. 9(b) is a diagram illustrating a waveform when the gain of a necessary band is increased by a filter 4 so as to carry out learning control in the first embodiment.

Here, although the tracking capability may be enhanced by increasing the gain of the characteristic shown in the left diagram of FIG. 9(a) across the entire band as shown in the right diagram of FIG. 9(a), increasing the gain across the band in this way cannot be realized because of the following reasons. One of the reasons is that the high-order mechanical resonant point of an actuator exists mostly in 10 kHz to 50 kHz, and therefore, the phase margin or gain margin deteriorates.

Further, reference numeral 5 denotes a defect detection unit (correlation detection unit) for detecting unnecessary signal components mixed in the compensated signal 100, i.e., microscopic noise components and noise components having no periodicity generated due to scratches on an optical disc, device vibrations or the like. This can be realized by carrying out correlation detection between the compensated signal 100 and a good signal, i.e., a compensated signal which unnecessary signal components did not mix into.

Reference numeral 6 denotes a memory control unit for carrying out memory control such as limiting the content to be stored in the memory unit 3 and only reading cut information which was already stored in the memory unit 3 on the basis of the defect detection results, that is, the detection results of unnecessary signal components, detected by the defect detection unit 5.

Next, an operation of the disc control device according to the first embodiment of the present invention will be described.

Meanwhile, the case where a focus error signal in an optical disc device, for example, is inputted as a compensated signal as an input signal will be described.

When a focus signal 100 as a compensated signal is inputted to the adder 1, an output signal of the adder 1 is inputted to the filter 4 which constitutes a feedback system. Then, by passing through the filer 4 having a previously-set cut off frequency, the output signal of the adder 1 is outputted from the filter 4 as a signal having a necessary frequency band which performs repetition control.

Thereafter, the signal outputted from the filter 4 is stored by the memory unit 3 as signal information corresponding to the immediately-prior single rotation of an optical disc, and this stored signal is fed back to the adder 1 via a gain element β2. By carrying out such process, it becomes possible to fully suppress the steady state error of a signal on which feedback control is carried out.

Meanwhile, β as the gain element 2 is $0<\beta\leqq1$ due to the stability conditions for repetition control, which is a coefficient for making the degree of leaning no to be 100% all of the time and is used to carry out control in an optical disc device stably and to enhance only the tracking capability without broadening a control band.

on the other hand, the defect detection unit 5 detects noise components included in the compensated signal 100 on the basis of a RF signal obtained from an optical pickup, and a full added signal to which all of RF signals from a tertamatic sensor of the optical pickup are added, and on the basis of the detection result by the defect detection unit 5, the memory control unit 6 controls input/output of the compensated signal 100 to/from the memory unit 3.

Hereinafter, specific examples of operations performed by the defect detection unit 5 and the memory control unit 6 will be described with reference to FIG. 2, FIGS. 9(a), 9(b).

Figure 2:
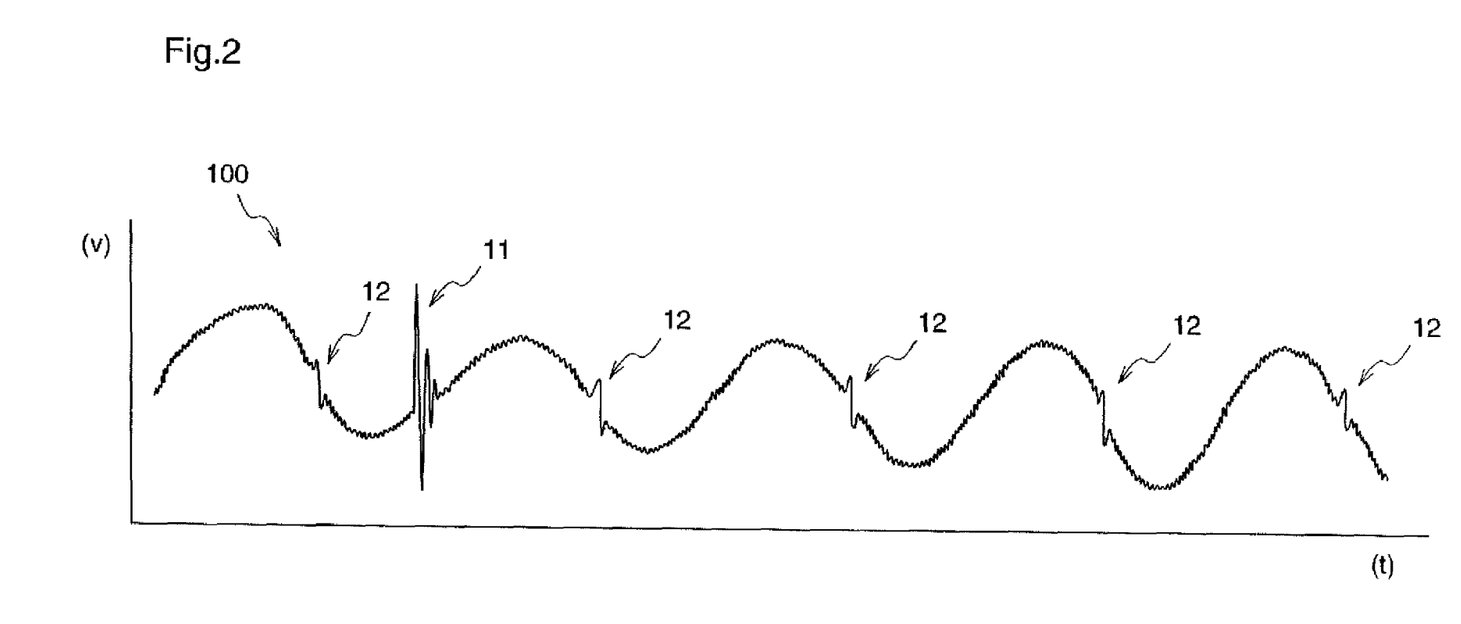
FIG. 2 is a block diagram illustrating one example of a compensated signal which includes noise components.

FIG. 2 is a diagram illustrating one example of a compensated signal containing a plurality of noise components. In FIG. 2, the longitudinal axis indicates the power voltage of the focus error signal 100 as the compensated signal and the horizontal axis indicates time.

Meanwhile, it is assumed that the compensated signal 100 shown in FIG. 2 is superposed with, other than microscopic noise components generated in a signal transmission path, a noise component 11 having periodicity which is generated due to surface runout and eccentricity of an optical disc, scratches on an optical disc, device vibrations, or the like and a high frequency component 12 having periodicity which is generated due to partial surface runout and partial eccentricity which physically take place when an optical disc is operated at high speed.

When the compensated signal 100 as shown in FIG. 2 is inputted to the defect detection unit 5, the defect detection unit 5 first detects a noise component having a size larger than a previously-set predetermined threshold, and then, outputs the detected information to the memory control unit 6 as a detection result after determining whether or not the detected noise component has periodicity.

That is, the defect detection unit 5 detects noise components through comparison with the internal threshold by a comparator, and by the correlation detection unit for detecting a correlation between a good signal stored in the memory unit and the compensated signal, and further detects periodicity of the noise components by a frequency analysis unit.

Thereby, the noise component 11 having no periodicity and the high frequency component 12 having periodicity are detected by the defect detection unit 5, and they will be outputted to the memory control unit 6. Meanwhile, it is possible to remove the microscopic noise components which are superposed on the compensated signal 100 shown in FIG. 2 by a filter other than the filter 4.

Here, if a compensated signal which is superposed with the noise component 11 having no periodicity is hypothetically stored in the memory unit 3, a signal superposed with the noise component 11 will be fed back whereby becoming a unstable factor for the control system. Consequently, when a noise component having no periodicity as indicated by the noise component 11 is detected, the memory control unit 6 stops inputting compensated signals to the memory unit 3 and controls the memory unit 3 so as not to update information to be stored therein.

Further, at this time, by only continuing reading the memory content with using already-stored periodic signal information effectively, the memory control unit 6 controls the memory unit 3 so as that only the address information is updated.

On the other hand, as for the high frequency component 12 having periodicity, by feed backing a signal superposed with the high frequency component 12, the high frequency 12 can be suppressed as a result. Therefore, when a component having periodicity as indicated by the high frequency component 12 is detected, the memory control unit 3 controls the memory unit 3 to store a compensated signal superposed with the high frequency component 12.

That is, this disc control device removes microscopic noise components superposed on a compensated signal of an optical disc device and noise components having no periodicity which are generated due to scratches on an optical disc and vibration of the optical disc device, and suppresses the components having periodicity by making the memory unit 3 to learn the high frequency component 12 having periodicity which is generated due to partial surface runout, partial eccentricity, or the like that occurs physically when an optical disc is operated at high rotation speed.

At that time, the filter 4 is used to determine the learning band of the memory unit 3, and the microscopic noise components are removed by a filter other than the filter 4, and the memory control unit 6 prevents the memory unit 3 to be updated by the noise component 11 having no periodicity generated due to scratches in order to prevent microscopic noise components and the noise component 11 to be stored in the memory unit 3.

As described above, in the disc control device according to the first embodiment of the present invention, the memory control unit 6 controls storing to and reading from the memory unit 3 provided in the signal feedback system on the basis of the defects detected by the defect detection unit 5. Therefore, even in the case where recording or reproduction process is carried out on a non-standard poor-quality disc at high rotation speed or accidental disturbances are mixed, an optimum processing can be performed in accordance with the type of noise component superposed on a compensated signal, and thereby enabling to carry out focus tracking control stably.

Meanwhile, in the first embodiment of the present invention, although the case where a compensated signal as an input signal is a focus error signal of an optical pickup was described, the compensated signal is not limited to a focus error signal and may be a focus driving signal or the like. Consequently, error suppression effects, such as to bring steady-state error close to zero, can be obtained. Moreover, even in tracking control, in which the eccentricity of an optical disc is the tracking object, it becomes possible to suppress errors by using the construction of the present invention.

Furthermore, in the first embodiment of the present invention, although the case where the defect detection unit 5 detects noise components and whether or not the noise components have periodicity and the memory control unit 6 controls the memory unit 3 so as not to learn noise components having no periodicity but to learn high frequency components having periodicity was described, there are particularly no limitations for detection information by the defect detection unit 5 and a control method by the memory control unit 6. For example, the memory control unit 6 may carry out storing to and reading from the memory unit 3 based only on with or without noise components detected by the defect detection unit 5.

Second Embodiment

Next, a disc control device according to a second embodiment of the present invention will be described.

Figure 3:
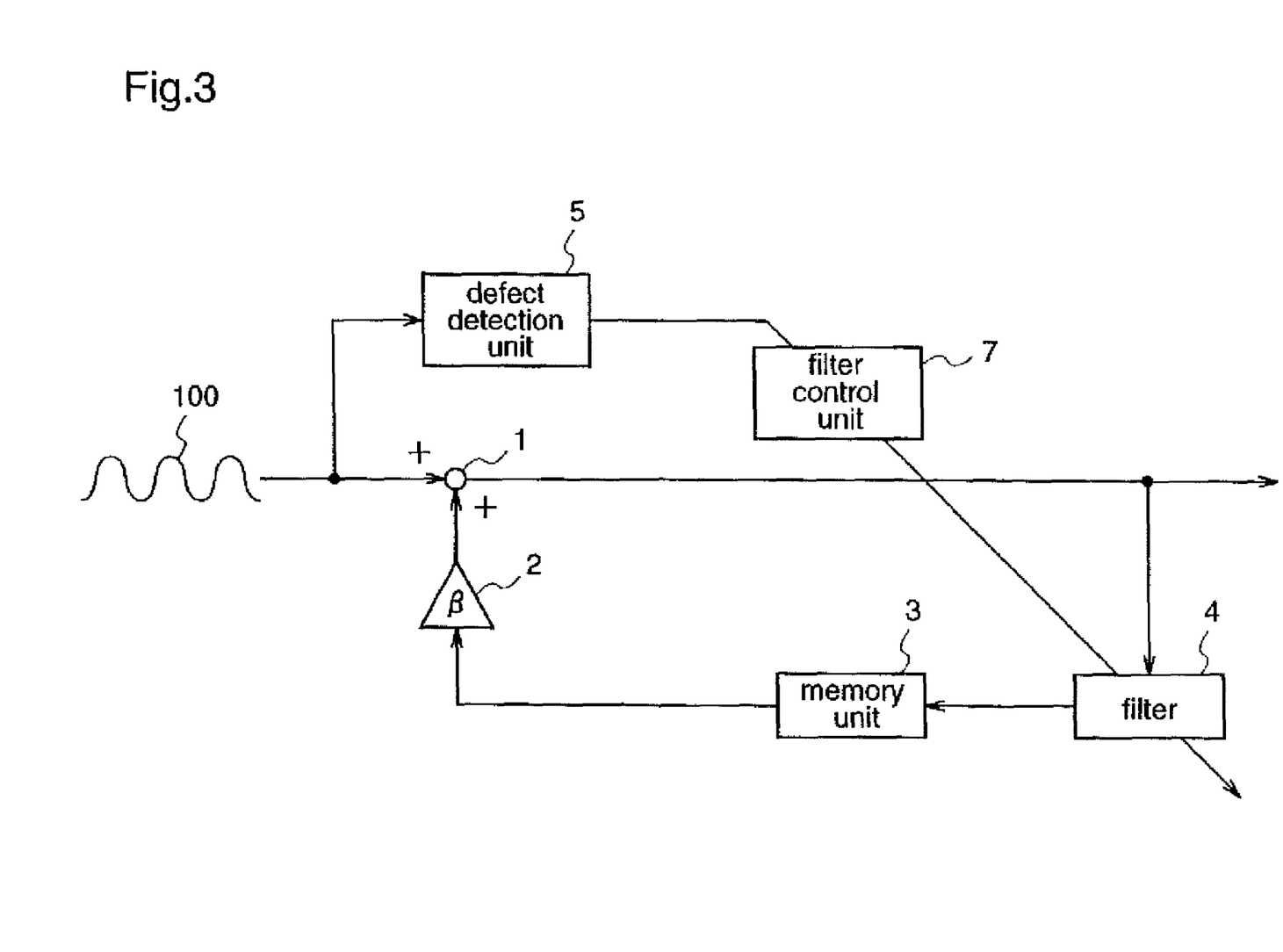
FIG. 3 is a block diagram illustrating one example of a construction of a disc control device according to a second embodiment of the present invention.

FIG. 3 is a block diagram illustrating one example of a construction of the disc control device according to the second embodiment of the present invention.

In FIG. 3, reference numeral 1 denotes an adder for adding a compensated signal inputted thereto and an output signal from a memory unit 3 via a gain element β, reference numeral 2 denotes a gain element β as an attenuation gain for varying the degree of learning, reference numeral 3 denotes a memory unit for storing an output signal from a filter 4, and reference numeral 4 denotes, as similar to that in the first embodiment, a filter for making the output signal from the adder 1 to have a necessary leaning band.

Figure 9C:
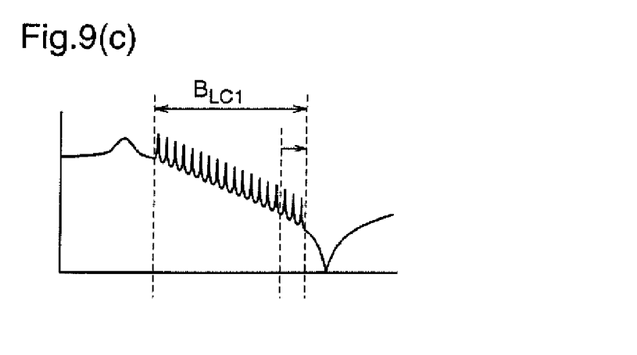
FIG. 9(c) is a diagram illustrating a waveform when the cut off frequency of the filter 4 is expanded to the higher frequency side by increasing memory resolution in the first embodiment.

However, in the second embodiment, this filter can vary a necessary learning band freely as shown in FIG. 9(c) such as to obtain a wider learning band BLC1 by extending the cut-off frequency thereof in accordance with the frequency band of a compensated signal which is inputted thereto as shown in FIG. 9(c).

Further, reference numeral 5 denotes a defect detection unit for detecting noise components mixed in a compensated signal and reference numeral 7 denotes a filter control unit for varying the cut-off frequency of the filter 4 on the basis of the defects detected by the defect detection unit 5.

Next, an operation of the disc control device according to the second embodiment of the present invention will be described.

Meanwhile, the case where a focus error signal in an optical disc device is inputted as the compensated signal 100 as an input signal will be described.

When a focus error signal 100 as a compensated signal is inputted to the adder 1, an output signal of the adder 1 is inputted to the filter 4 which constitutes a feedback system. Then, by passing through the filter 4 having a previously-set cut off frequency, the output signal of the adder 1 is outputted from the filter 4 as a signal having a necessary frequency band which performs repetition control.

Thereafter, the signal outputted from the filter 4 is stored in the memory unit 3 as, for example, signal information corresponding to the immediately-prior single rotation of an optical disc, and this stored signal is fed back to the adder 1 via a gain element β2. By carrying out such process, it becomes possible to fully suppress the steady-state error of a signal on which feedback control is carried out.

Meanwhile, β as the gain element 2 is 0<β≦1 due to the stability conditions for repetition control, which is a coefficient for preventing the degree of leaning to be 100% all of the time and is used to carry out control stably in an optical disc device and to enhance only the tracking capability without broadening a control band.

On the other hand, the defect detection unit 5 detects noise components contained in the compensated signal 100 on the basis of an RF signal, a full added signal, or the like, and on the basis of a detection result by the defect detection unit 5, the filter control unit 7 varies the cut-off frequency of the filter 4.

Hereinafter, specific examples of operations performed by the defect detection unit 5 and the filter control unit 7 will be described with reference to FIG. 2.

FIG. 2 is a diagram illustrating one example of the compensated signal 100 containing noise components. Meanwhile, it is assumed that the compensated signal 100 shown in FIG. 2 is superposed with, other than microscopic noise components generated in a signal transmission path, a noise component 11 having no periodicity which is generated due to surface runout and eccentricity of an optical disc, scratches on an optical disc, device vibration, or the like, and a high frequency component 12 having periodicity which is generated due to partial surface runout, partial eccentricity, or the like that physically occurs when an optical disc is operated at high-speed.

When the compensated signal 100 as shown in FIG. 2 is inputted to the defect detection unit 5, the defect detection unit 5 detects noise components superposed on the compensated signal and further detects information on whether the noise components have periodicity or not and information on the frequency bands of the detected noise components, and outputs the detected information to the filter control unit 7 as a detection result.

Thereby, microscopic noise components which are superposed entirely on the compensated signal, the noise component 11 having no periodicity, and the high frequency component 12 having periodicity will be detected by the defect detection unit 5, and information on the frequency band of each component will be outputted to the filter control unit 7.

Here, if the compensated signal 100 superposed with the microscopic noise components and the noise component 11 having no periodicity are hypothetically stored in the memory unit 3, the signal superposed with the noise components will be fed back whereby becoming a unstable factor for the control system.

Consequently, when microscopic noise component shown in FIG. 2 or the noise component 11 having no periodicity is detected, the filter control unit 7 controls the other filter to cut the frequency bands of the microscopic noise component and the noise component 11 having no periodicity on the basis of the information on the frequency bands of the noise components detected by the defect detection unit 5, in order to prevent the memory unit 3 to learn these noise components.

On the other hand, as for the high frequency component 12 having periodicity, by feed backing a signal superposed with the high frequency component 12, the high frequency 12 can be suppressed as a result. Consequently, the filter control unit 7 changes the cut-off frequency of the filter 4 in the direction to broaden a frequency band that carries out repetition control as indicated by the band BLC1 in FIG. 9(c) in order to make the memory unit 3 learn a component having periodicity as indicated by the high frequency component 12.

Thereby, it becomes possible to make the memory unit 3 to learn the high frequency component 12 generated due to partial surface runoff or partial eccentricity, and as a result, focus tracking control can be carried out stably and certainly.

As described above, in the disc control device according to the second embodiment of the present invention, the filter control unit 7 changes the cut-off frequency of the filter 4 on the basis of the defects detected by the defect detection unit 5, thereby enabling to carry out an optimum process in accordance with the type of component superposed on a compensated signal. Therefore, it becomes possible to carry out focus tracking control stably even when performing recording or reproduction process on a non-standard poor-quality disc at high speed.

Meanwhile, in the second embodiment of the present invention, although the case where a compensated signal as an input signal is a focus error signal of an optical pickup was described, the compensated signal is not limited to a focus error signal and it may be a focus driving signal or the like. Consequently, deviation suppression effects, such as to bring stationary error close to zero, can be obtained.

Moreover, even in tracking control where the tracking object is a disc eccentricity, it becomes possible to suppress errors by using the construction of the present invention.

Furthermore, in the second embodiment of the present invention, although a description was given of, unlike the defect detection unit 5 described in the first embodiment, the defect detection unit 5 which detects noise components, the periodicity of the detected noise component, and the information on the frequency band of the detected noise component, information that is detected by the defect detection unit 5 is not particularly limited.

For example, the cut-off frequency of a filter may be determined by that the defect detection unit 5 detects only a noise component superposed on a compensated signal and the periodicity of the detected noise component, and on the basis of those detection results and information on the cut-off frequency of the noise component which is previously stored in the filter control unit.

Third Embodiment

Next, a disc control device according to a third embodiment of the present invention will be described.

Figure 4:
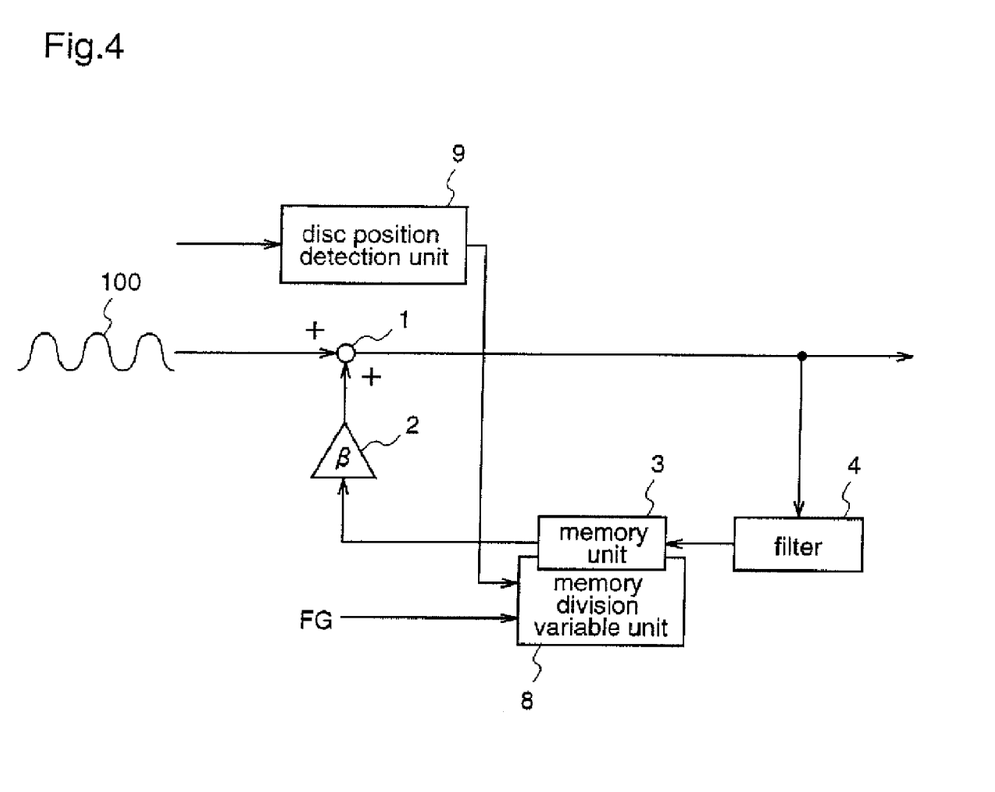
FIG. 4 is a block diagram illustrating one example of a construction of a disc control device according to a third embodiment of the present invention.

FIG. 4 is a block diagram illustrating one example of a construction of the disc control device according to the third embodiment of the present invention.

In FIG. 4, reference numeral 1 denotes an adder for adding a compensated signal which is inputted thereto and an output signal from a memory unit 3 via a gain element β, reference numeral 2 denotes a gain element β as an attenuation gain for varying the degree of learning, reference numeral 3 denotes a memory unit for storing an output signal from a filter 4, reference numeral 4 denotes a filter for making the output signal from the adder 1 to have a necessary leaning band, as similar to that in the first embodiment.

Further, reference numeral 8 denotes a memory division variation unit for varying the number of memory divisions of the memory unit 3 on the basis of the position on an optical disc detected by a disc position detection unit 9 and an FG signal, and reference numeral 9 denotes a disc position detection unit for detecting a position on an optical disc during recording and reproduction processes.

Next, an operation of the disc control device according to the third embodiment of the present invention will be described. Meanwhile, the case where a focus error signal in an optical disc device is inputted as a compensated signal as an input signal will be described herein.

When a focus error signal as a compensated signal is inputted to the adder 1, an output signal of the adder 1 is inputted to the filter 4 which constitutes a feedback system. Then, by passing through the filter 4 having a previously-set cut off frequency, the output signal of the adder 1 is outputted from the filter 4 as a signal having a necessary frequency band which carries out repetition control.

Thereafter, the signal outputted from the filter 4 is stored in the memory unit 3 as signal information corresponding to the immediately-prior single rotation (or plural rotations) of an optical disc, and this stored signal is fed back to the adder 1 via a gain element β2. By carrying out such process, it becomes possible to fully suppress the steady-state error of a signal on which feedback control is carried out.

Meanwhile, β as the gain element 2 is 0<β≦1 due to the stable condition of repetition control, which is a coefficient for preventing the degree of leaning to be 100% (an oscillation condition of the system) all of the time, and is used to carry out control stably in an optical disc device and to enhance only the tracking capability without broadening a control band.

On the other hand, the disc position detection unit 9 detects a position on a disc on the basis of disc position information which indicates where the optical pickup is positioned on the optical disc, and on the basis of a detection result by the disc position detection unit 9, the memory division variation unit 8 varies the number of memory divisions of the memory unit 3.

Meanwhile, varying of memory resolution by the memory division variation unit 8 is realized by that the memory division variation unit 8 generates a desirable memory switching clock in order to PLL lock the memory switching clock for the memory unit 3 and an FG signal, and the generated memory switching clock carries out switching of a plurality of memory areas included in the memory unit 3.

Next, specific examples of operations performed by the disc position detection unit 9 and the memory division variation unit 8 will be described with reference to FIG. 5.

Figure 5A:
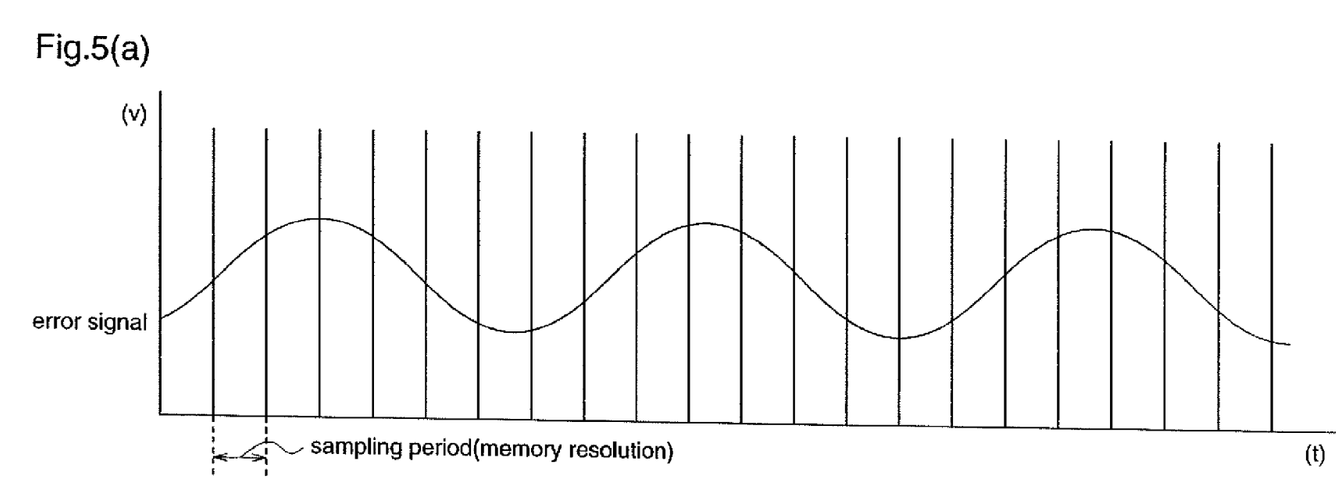
FIG. 5(a) is a diagram illustrating one example of storing at a memory unit when the memory resolution is low and FIG. 5(b) is a diagram illustrating one example of storing at the memory unit when the memory resolution is high.
Figure 5B:
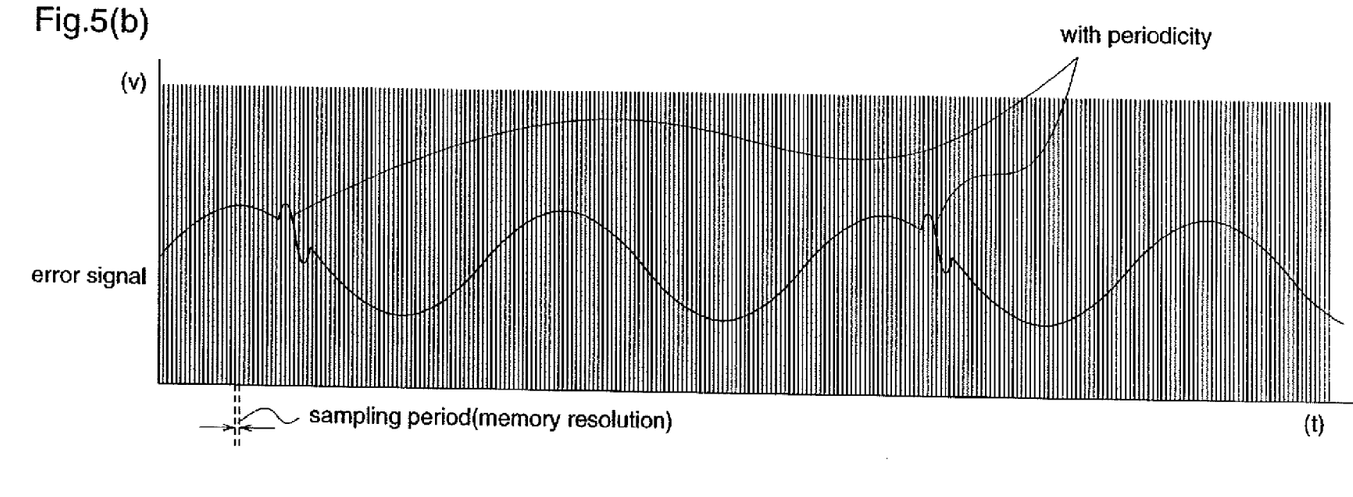

FIG. 5 is a diagram illustrating one example of a stored content in the memory unit 3 when the memory resolution is varied. Meanwhile, the longitudinal axis indicates the power voltage of a focus error signal as the compensated signal and the horizontal axis indicates time.

FIG. 5(a) is a diagram illustrating the case where the memory resolution is low and an error signal corresponding to a single rotation stored in the memory unit 3. To the contrary, FIG. 5(b) illustrates the case where the memory resolution is high.

Due to an increase in recording and reproduction speed of an optical disc, partial surface runout and partial eccentricity which have different frequency components from normal surface runoff and eccentricity appear prominently around the periphery of an optical disc. This partial surface runout or partial eccentricity occurs due to that such as polycarbonate as a material of an optical disc, terbium-iron-cobalt used for the recording layer, and the like are distorted, sagged, or become uneven around the periphery when the disc was manufactured.

If the memory resolution remains low when high frequency components due to the partial surface runout or partial eccentricity are superposed on normal surface runout or partial eccentricity, these high frequency components are remained superposed on a remnant error, and as a result, the high frequency components due to the partial surface runout and partial eccentricity will be remained in a defocus amount and de-track amount.

Consequently, when it comes near the periphery of an optical disc, which is likely to be affected physically by the partial surface runout or partial eccentricity, the memory division variation unit 8 varies the memory resolution in a direction to increase the same on the basis of a detection result by the disc position detection unit 9 as shown in FIG. 5(b). Therefore, by increasing the resolution of the leaning memory during repetition control to carry out highly precise repetition control, it becomes possible to fully suppress errors.

In particular, by enhancing the memory resolution in this way when performing recording/reproduction process on an optical disc at high-speed, the memory unit 3 can learn relatively high frequency components such as partial surface runout and partial eccentricity, thereby enabling to carry out more precise repetition control.

On the other hand, around the inner periphery of an optical disc which is relatively less affected by partial surface runout or partial eccentricity, the size of the memory or the number of access to the memory can be reduced by that the memory division variation unit 8 varies the resolution of the memory in a direction to reduce the same as shown in FIG. 5(a).

Moreover, when the area of an optical disc is separated into Zone CLV and Zone CAV, it becomes possible to vary the memory resolution with respect to each reproduction area on the basis of the position on the optical disc detected by the disc position detection unit 9.

As described above, in the disc control device according to the third embodiment of the present invention, since the memory division variation unit 8 varies the memory resolution of the memory unit 3 provided in the signal feedback system, it becomes possible to carry out repetition control in accordance with the position on an optical disc at which recording or reproduction is performed. As a result, focus and tracking control can be carried out with certainty.

Fourth Embodiment

Next, a disc control device according to a fourth embodiment of the present invention will be described.

Figure 6:
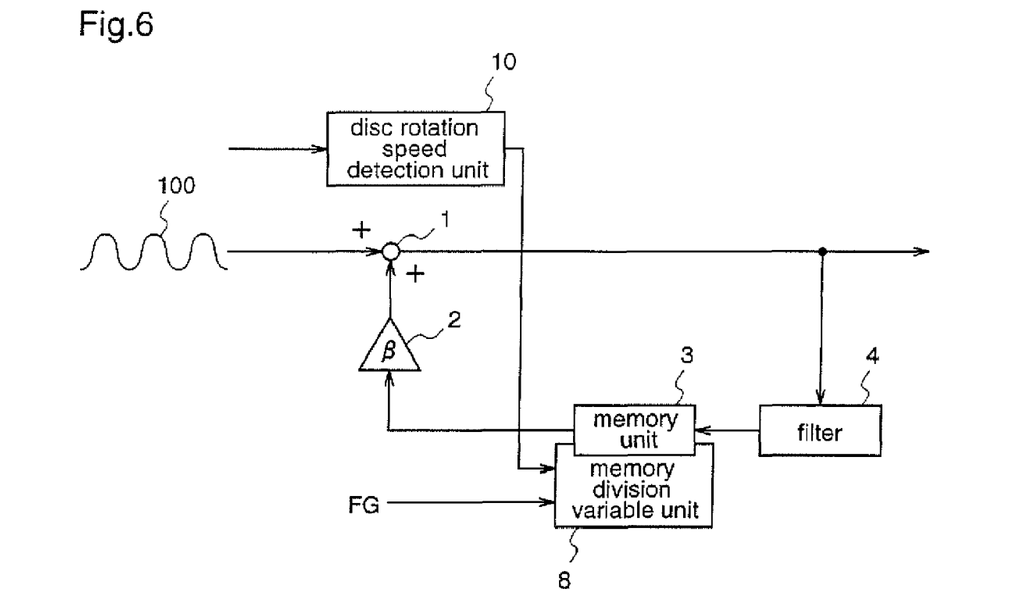
FIG. 6 is a block diagram illustrating one example of a construction of a disc control device according to a fourth embodiment of the present invention.

FIG. 6 is a block diagram illustrating one example of a construction of the disc control device according to the fourth embodiment.

In FIG. 6, reference numeral 1 denotes an adder for adding a compensated signal which is inputted thereto and an output signal from a memory unit 3 via a gain element β, reference numeral 2 denotes a gain element β as an attenuation gain for varying the degree of learning, reference numeral 4 denotes a filter for making an output signal from the adder 1 to have a necessary leaning band, as similar to that in the first embodiment.

Further, reference numeral 8 denotes a memory division variation unit for varying the number of memory divisions of the memory unit 3 on the basis of the disc rotation speed detected by a disc rotation speed detection unit 10 and an FG signal, and reference numeral 10 denotes a disc rotation speed detection unit for detecting the rotation speed of a disc.

Next, an operation of the disc control device according to the fourth embodiment will be described. Meanwhile, the case where a focus error signal in an optical disc device is inputted as a compensated signal as an input signal will be described herein.

When a focus error signal as a compensated signal is inputted to the adder 1, an output signal is inputted to the filter 4 which constitutes a feedback system. Then, by passing through the filter 4 having a previously-set cutoff frequency, the output signal from the adder 1 is outputted from the filter 4 as a signal having a necessary frequency which carries out repetition control.

Thereafter, the signal outputted from the filter 4 is stored in the memory unit 3 as signal information corresponding to the immediately-prior single rotation of an optical disc, and this stored signal is fed back to the adder 1 via a gain element β2. By carrying out such process, it becomes possible to fully suppress the steady-state error of a signal on which feedback control is carried out.

Meanwhile, β as the gain element 2 is 0<β≦1 due to the stability conditions for repetition control, which is a coefficient for making the degree of leaning no to be 100% all of the time and is used to carry out control in an optical disc device with stability and to enhance only the tracking capability without broadening a control band.

On the other hand, the disc rotation speed detection unit 10 detects the rotation speed of an optical disc, and in accordance with the rotation speed, the memory division variation unit 8 varies the number of memory divisions. Meanwhile, as for varying of the memory resolution by the memory division variation unit 8, it becomes possible to determine the number of memory divisions depending on to which number the FG signal is divided by VCO with relative to a single period of FG signal when a PLL is constructed using the FG signal.

As an example, a case where outputting X pulses as an FG signal with respect to a single rotation of an optical disc, and dividing the pulses into Y pieces by VCO, the number of divisions of the memory becomes X×Y. The memory division variation unit 8 can set the number of memory divisions on the basis of the FG signal whose periodicity varies in accordance with the disc rotation speed.

Next, specific examples of operations performed by the disc rotation speed detection unit 10 and the memory division variation unit 8 will be described.

For example, when recording information on an optical disc at a CAV, the rotation speed increases toward the periphery. Further, emergence of partial surface runout and partial eccentricity becomes prominent around the periphery. Therefore, the memory division variation unit 8 varies the memory resolution of the memory unit 3 in a direction to increase the same in accordance with an increase in the disc rotation speed that is detected by the disc rotation speed detection unit 10.

Therefore, by increasing the memory resolution of the learning memory during the repetition control, and carrying out highly precise repetition control, it becomes possible to fully suppress deviations. When performing recording/reproduction process on an optical disc at high speed in particular, by enhancing the memory resolution in this way, becomes possible to make the memory unit 3 learn relatively high frequency components such as partial surface runout and partial eccentricity, thereby enabling to carry out a more precise repetition control.

To the contrary, the size of the memory or the number of access to the memory can be reduced during low speed operation by reducing the memory resolution.

As described above, in the disc control device according to a fourth embodiment of the present invention, the memory division variation unit 8 varies the memory resolution of the memory unit 3 provided in the signal feedback system on the basis of a detection the rotation speed detected by the rotation speed detection unit 10, thereby enabling to carry out repetition control in accordance with the rotation speed of an optical disc. Consequently, focus and tracking control can be carried out stably.

Meanwhile, in the second embodiment of the present invention, although the case where a compensated signal as an input signal is a focus error signal of an optical pickup was described, the compensated signal is not limited to a focus error signal and it may be a focus driving signal or the like. Consequently, error suppression effects, such as to bring stationary error close to zero, can be obtained. Moreover, even in tracking control, where the tracking object is eccentricity of an optical disc, it becomes possible to fully suppress errors by using the construction of the present invention.

Fifth Embodiment

Next, a disc control device according to a fifth embodiment of the present invention will be described.

Figure 7:
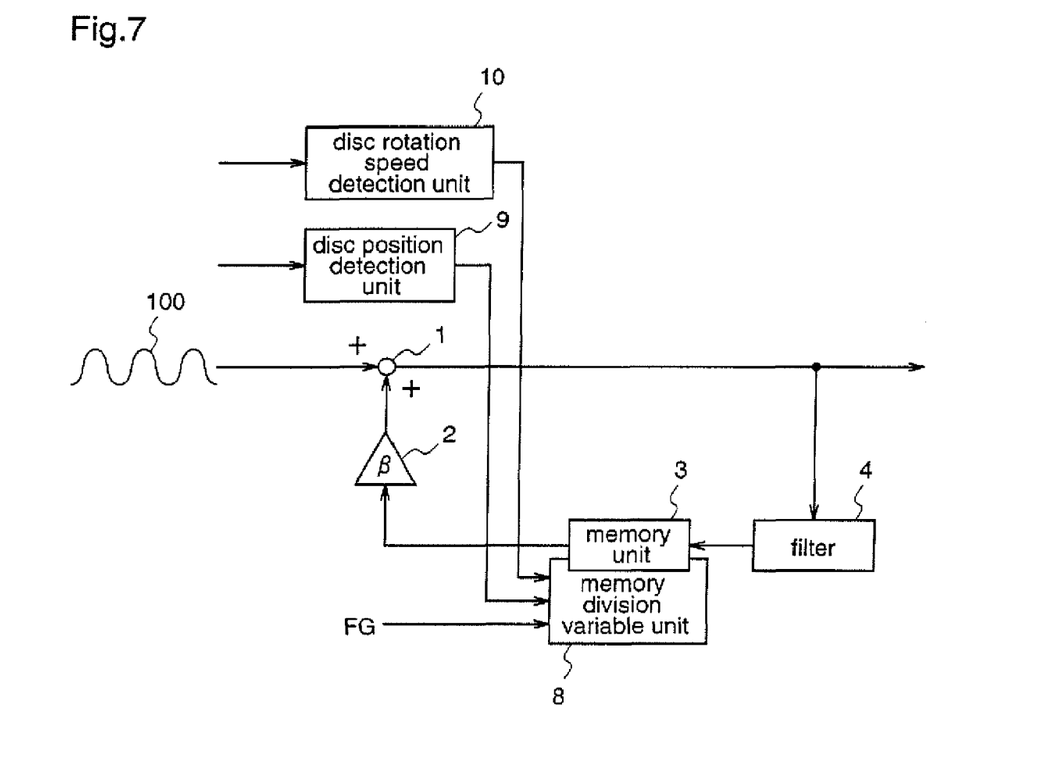
FIG. 7 is a block diagram illustrating one example of a construction of a disc control device according to a fifth embodiment of the present invention.

As shown in FIG. 7, the disc control device according to the fifth embodiment of the present invention comprises, in addition to the components of the disc control device described in the third embodiment, the disc rotation speed detection unit 10 described in the fourth embodiment.

By having the construction as described above, a position on an optical disc can be detected by the disc position detection unit 9 and the rotation speed of the optical disc can be detected by disc rotation speed detection unit 10, thereby enabling, when performing recording/reproduction process in an optical disc device, to know where the optical pickup is positioned on the optical disc and the rotation speed at that time.

And on the basis of this information, the memory division variation unit 8, in the case where the optical pickup is positioned around the periphery of the optical disc at a high speed operation and partial surface runout or partial eccentricity appears prominently, increases the resolution of a learning memory during repetition control by changing the number of memory divisions of the memory unit 3 in the direction to increase the same so as to carry out repetition control more precisely. Therefore, errors can be suppressed.

On the other hand, around the inner periphery, which is relatively less affected by partial surface runout or partial eccentricity, or when performing recording/reproduction process at low speed, since errors can be sufficiently suppressed even if the memory resolution is reduced, the size of the memory or the number of access to the memory can be reduced by that the memory division variation unit 8 varies the number of memory divisions of the memory unit 3 in a direction to reduce the same.

As described above, in the disc control device according to the fifth embodiment of the present invention, the memory division variation unit 8 varies the memory resolution of the memory unit 3 provided in the signal feedback system on the basis of the disc position detected by the disc position detection unit 9 and the disc rotation speed detected by the disc rotation speed detection unit 10, thereby enabling to carry out repetition control in accordance with a position on an optical disc at which recording or reproduction operation is carried out or the rotation speed of the optical disc, and to optimize repetition control during focus and tracking control.

Sixth Embodiment

Next, a disc control device according to a sixth embodiment of the present invention will be described.

Figure 8:
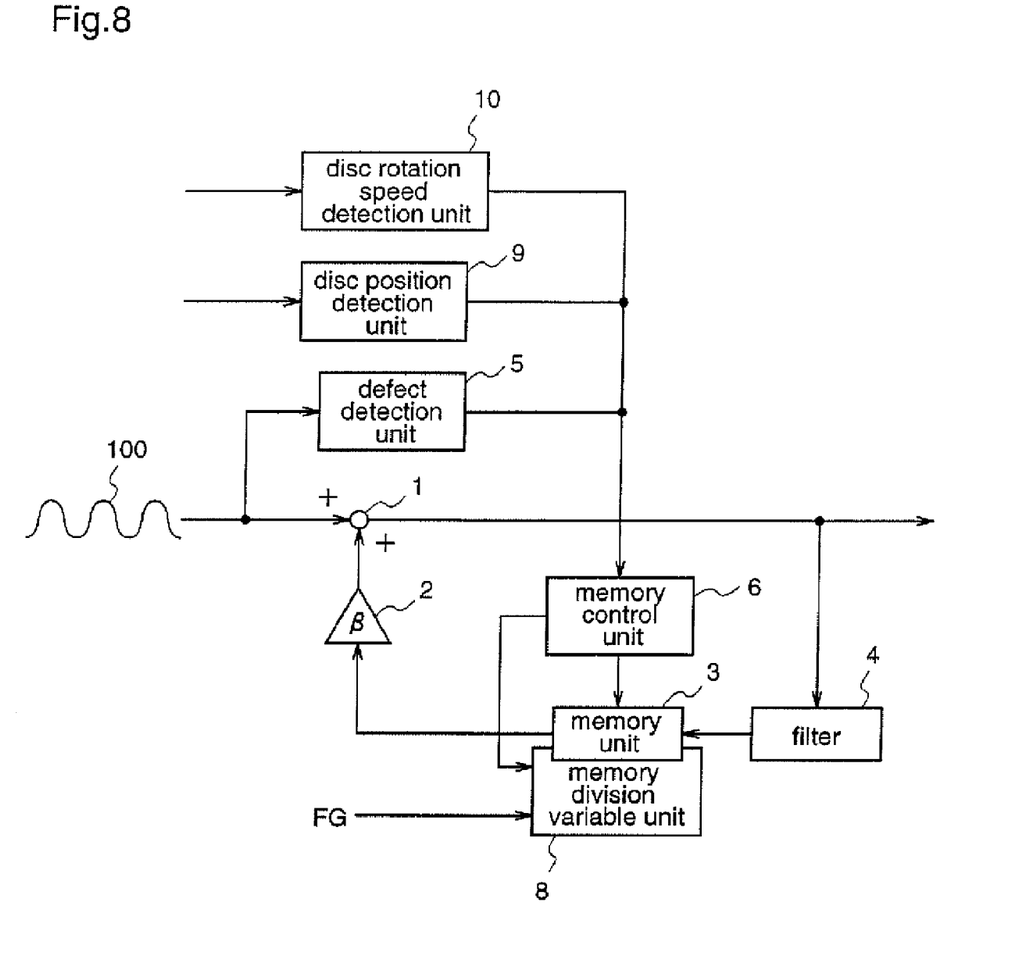
FIG. 8 is a block diagram illustrating one example of a construction of a disc control device according to a sixth embodiment of the present invention.

The disc control device according to the sixth embodiment of the present invention comprises, in addition to the components of the disc control device described in the first embodiment, the memory division variation unit 8, the disc position detection unit 9, and the disc rotation speed detection unit 10 which are described in the fifth embodiment.

By having the construction as described above, storing to and reading from the memory unit 3 can be controlled by the memory control unit 6 when unexpected disturbance or the like is detected by the defect detection unit 5.

Further, since the memory division variation unit 8 varies the memory resolution of the memory unit 3 on the basis of the optical disc position detected by the optical disc position detection unit 9 and the disc rotation speed detected by the disc rotation speed detection unit 10, focus tracking control can be carried out stably.

Moreover, in the case where partial surface runout or partial eccentricity became prominent around the periphery of an optical disc during high speed recording or reproduction process, and a high frequency component having periodicity generated due to the above is superposed on a compensated signal, the high frequency component having periodicity can be first detected through the defect detection by the defect detection unit 5.

Further, from a detection result by the disc position detection unit 9 which indicates that the position is around the periphery of the optical disc and a detection result by the disc rotation speed detection unit 10 which indicates that the rotation speed of the optical disc is, for example, 16× (fast speed), the high frequency component detected by the defect detection unit 5 can be identified as that it is obviously generated due to the partial surface runout or partial eccentricity.

Then, on the basis of the above detection results, it becomes possible to carry out varying of the memory resolution by the memory division variation unit 8 more precisely.

As described above, in the disc control device according to the sixth embodiment of the present invention, the memory control unit 6 controls storing to and reading from the memory unit 3 provided in the signal feedback system on the basis of the defects detected by the defect detection unit 5 and the memory division variation unit 8 varies the memory resolution of the memory unit 3 provided in the signal feedback system on the basis of the disc position detected by the disc position detection unit 9 and the disc rotation speed detected by the disc rotation speed detection unit 10. Therefore, even when performing recording or reproduction operation on a non-standard and poor-quality disc, it becomes possible to carry out focus and tracking control stably and certainly compared to an optical disc device employing conventional repetition control.

Meanwhile, although a construction in which a disc position detection result outputted from the disc position detection unit 9 and a disc rotation speed detection result outputted from the disc speed rotation speed detection unit 10 are outputted to the memory division variation unit 8 via the memory control unit 6 is taken in FIG. 8 shown in the sixth embodiment of the present invention, these detection results can be outputted directly to the memory division variation unit 8 as indicated in the fifth embodiment.

Further, although each of the embodiments is described by taking a disc control device for controlling an optical disc device as an example, a control device for a disc device in which noises superposed with noises having no periodicity and high-frequency noises having periodicity are generated may be applicable in other control device. Furthermore, although how to set the value of β of the gain element 2 is not particularly described, this may be carried out by a system controller (not illustrated) of the optical disc device at the beginning of the operation.

Further, although a mechanism for carrying out recording control when storing an output signal of the filter 4 in the memory unit 3 is not particularly described in each of the embodiments, this may be carried out by the memory control unit 6 or the above-described system controller.

INDUSTRIAL APPLICABILITY

The control device of the present invention is effective in improving stability of focus tracking control and the tracking capability in an optical disc device. Further, the present invention is applicable in usage of increasing speed and density of optical disc devices and recording and reproducing on/from a non-standard and poor-quality disc.

The invention claimed is:

1. A disc control device comprising:
an adder for receiving a compensated signal;
a signal feedback system including: a filter for making an output signal from said adder having a necessary learning band; a memory unit for storing an output signal from said filter; and a gain element for multiplying an output signal from said memory with a value less than 1 to output said adder, for outputting an output signal from said adder stored in said memory unit to said adder;
a correlation detection unit for detecting unnecessary signal components mixed into a compensated signal; and
a memory control unit for controlling, storing to, and reading from said memory unit in said feedback signal unit on the basis of such unnecessary signal components detected by said correlation detection unit.

2. A disc control device comprising:
an adder for receiving a compensated signal;
a signal feedback system including: a filter for making an output signal from said adder having a necessary learning band; a memory unit for storing an output signal from said filter; and a gain element for multiplying an output signal from said memory with a value less than 1 to output said adder, for outputting an output signal from said adder is stored in said memory unit to said adder;
a correlation detection unit for detecting unnecessary signal components mixed into a compensated signal; and a filter control unit for varying a cutoff frequency of a filter in said signal feedback system on the basis of unnecessary signal components detected by the correlation detection unit.

3. A disc control device comprising:

an adder for receiving a compensated signal;

a signal feedback system including: a filter for making an output signal from said adder having a necessary learning band; a memory unit for storing an output signal from said filter; and a gain element for multiplying an output signal from said memory with a value less than 1 to harvest said adder, for outputting an output signal from said adder stored in said memory unit to said adder;

a disc position detection unit for detecting a position on an optical disc; and a memory division variable unit for varying a memory division number for the memory unit in the signal feedback system on the basis of a position on a disc detected by the disc position detection unit.

4. A disc control device comprising:

an adder for receiving a compensated signal;

a signal feedback system including: a filter for making an output signal from said adder having a necessary learning band; a memory unit for storing an output signal from said filter; and a gain element for multiplying an output signal from said memory with a value less than 1 to output said adder, for outputting an output signal from said adder stored in said memory unit to said adder;

a disc rotation speed detection unit for detecting rotation speed of an optical disc, and a memory division variable unit for varying a memory division number for the memory in the signal feedback system on the basis of a rotation speed of an optical disc detected by the disc rotation speed detection unit.

5. A disc control device comprising:

an adder for receiving a compensated signal;

a signal feedback system including: a filter for making an output signal from said adder having a necessary learning band; a memory unit for storing an output signal from said filter; and a gain element for multiplying an output signal from said memory with a value less than 1 to output said adder, for outputting an output signal from said adder stored in said memory unit to said adder;

a disc position detection unit for detecting a position on an optical disc;

a disc rotation speed detection unit for detecting rotation speed of an optical disc; and a memory division variable unit for varying a number of memory divisions of the memory unit in the signal feedback system on the basis of a position on a disc detected by the disc position detection unit and the rotation speed of a disc detected by the disc rotation speed detection unit.

6. A disc control device comprising:

an adder for receiving a compensated signal;

a signal feedback system including: a filter for making an output signal from said adder having a necessary learning band; a memory unit for storing an output signal from said filter; and a gain element for multiplying an output signal from said memory with a value less than 1 to output said adder, for outputting an output signal from said adder stored in said memory unit to said adder;

a defect detection unit for detecting a noise component mixed in a compensated signal, a disc position detection unit for detecting a position on an optical disc, a memory control signal for controlling, storing to, and reading from the memory unit in the signal feedback system on the basis of defects detected by the defect detection unit; and a memory division variable unit for varying memory divisions of the memory unit in the signal feedback system on the basis of defects detected by the defect detection unit, a position on a disc detected by the disc position detection unit, and the rotation speed of an optical disc detected by the disc rotation speed detection unit.

* * * * *